Patented June 1, 1954

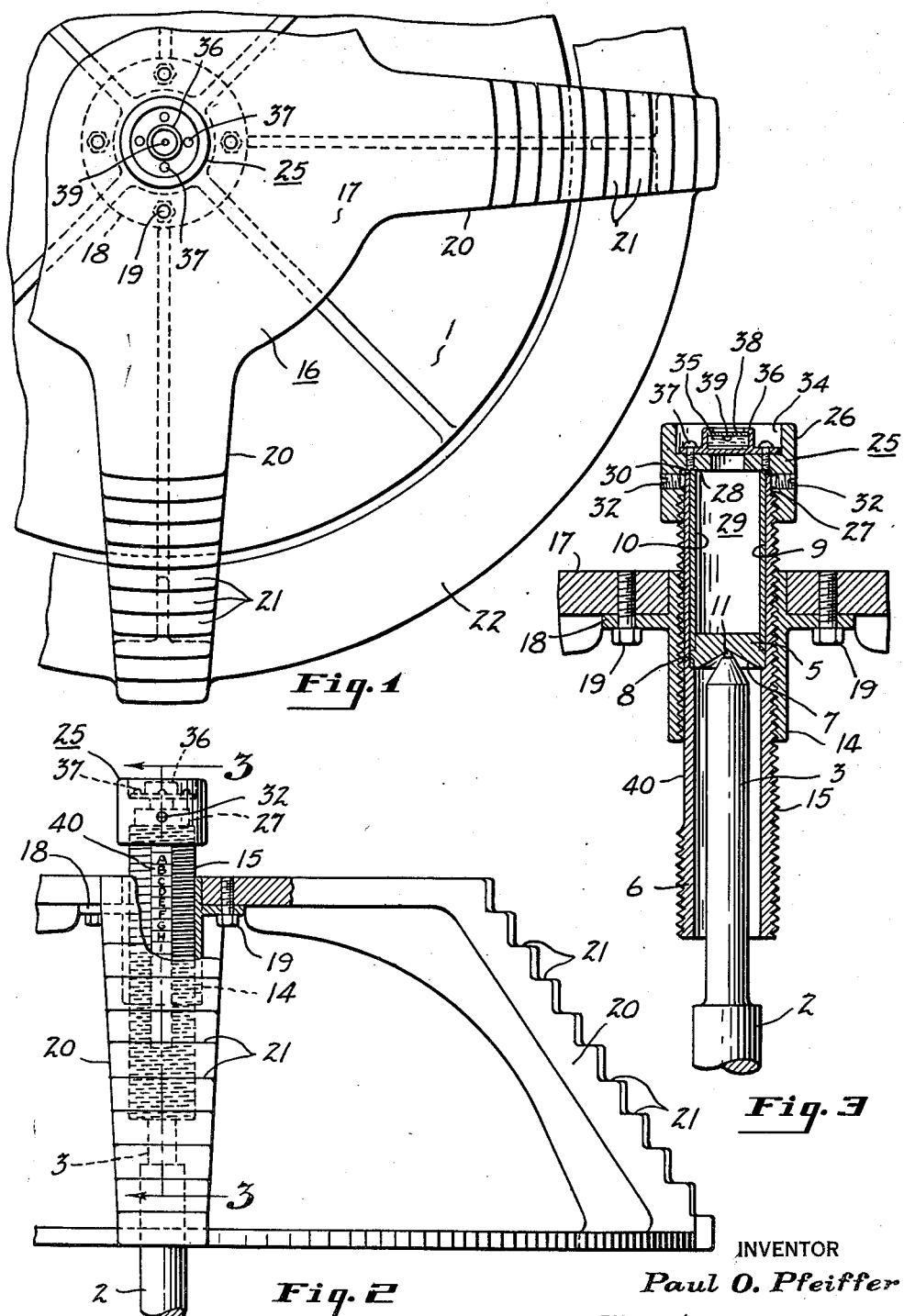
June 1, 1954 P. O. PFEIFFER 2,679,751
ADJUSTABLE BALANCE FOR TIRES AND WHEELS
Filed June 15, 1951
INVENTOR
Paul O. Pfeiffer
BY Evans & McCoy
ATTORNEYS

2,679,751

UNITED STATES PATENT OFFICE 2,679,751

ADJUSTABLE BALANCE FOR TIRES AND WHEELS

Paul O. Pfeiffer, Akron, Ohio, assignor to The General Tire and Rubber Company, Akron, Ohio, a corporation of Ohio Application June 15, 1951, Serial No. 231,699

3 Claims. (Cl. 73—66)

This invention relates to wheel and tire balances, and has particular reference to such balances used in statically balancing pneumatic vehicle tires, wheels and the like.

In balancing a tire or wheel assembly on a balance of the horizontal type in which the tire or wheel is mounted on a carrier supported by a vertical spindle, the desired condition of balance is obtained when the tiltable unit which comprises the tire or wheel and the carrier therefor comes to rest or is in equilibrium in a horizontal plane while supported by the spindle as a universal pivot. It has been recognized that the sensitivity of the balance is determined by the location of the center of gravity of the assembly or unit being balanced with respect to the upper end or balance point of the supporting spindle. Since tires and wheels vary in size and weight distribution, it has been customary to provide an adjustment for varying the center of gravity of the supported assembly. An adjustable balance is disclosed in United States Patent 2,270,657 and the present invention is concerned with improvements in a balance of the type shown.

One of the principal objects of the present invention is to provide a balance which has a carrier that can be adjusted while supporting a wheel or tire for the purpose of raising and lowering the center of gravity of the complete unit or assembly. In a specialized version of this aspect of the invention there is provided a tire or wheel receiving member that is threaded onto a pivot member so that by relative rotation of one with respect to the other the vertical height of the carrier can be adjusted. More precisely stated the invention provides a particular type of threaded height adjustment for the tire or wheel carrier of the balance, the parts being so arranged that with a tire or wheel supported horizontally in test position the operator can readily rotate one part while manually restraining the other part against rotation and thereby screw the one part up or down on the other.

A further object is to provide a balance structure that is simple and relatively inexpensive to manufacture. Other objects and advantages pertaining to novel features of construction and combinations and arrangements of parts are apparent in the following description made in connection with the accompanying drawings forming a part of the specification.

In the drawings:

Figure 1 is a fragmentary plan view of the balance, parts being broken away and removed;

Fig. 2 is a fragmentary elevational view, partly in section and with parts broken away and removed, of the balance shown in Fig. 1; and Fig. 3 is a sectional detail taken vertically through the carrier substantially along the axis of the pivot spindle, this view being enlarged with respect to the other figures.

The wheel balance comprises a base or stand 1 having mounted thereon an upwardly extending substantially vertical rod or post 2 surmounted by a spindle 3 of hardened metal such as steel drill rod. This spindle is formed with a tapered upper end 4 and a hard steel ball 11 may be recessed into the tip to serve as a bearing or fulcrum for the tiltable carrier.

The carrier or holder which receives the wheel or tire to be balanced comprises a tubular member 6 that is received over the spindle 3. It contains a pivot element 5 formed with a conical or tapered socket 7 in which is engaged the fulcrum ball 11 on the end of the spindle. The conical socket 7 is axially aligned with and centered in the passage in the tubular member 6, such passage being sufficiently larger than the spindle 3 to permit limited tilting of the carrier in use.

The seat or fulcrum element 5 may take the form of a cylindrical hard metal plug that is engaged against a locating shoulder 8 formed by a counterbore 9 in the upper part of the tubular member 6. A spacer element in the form of a metal tube 10 is received in the upper end of the tubular member 6 between the fulcrum element 5 and a cap or knob 25 to locate the fulcrum element and hold it against the shoulder 8.

Mounted on the tubular member 6 in vertically adjustable embracing relation is a flanged sleeve 14. Both the tubular member and the sleeve 14 are formed of tough wear resistant material such as brass or steel, the adjustable relationship preferably being provided by internal threads on the sleeve which engage external threads 15 extending the full length of the tubular member 6.

A suitable wheel or tire receiving device or platform is supported on the sleeve 14. This receiver, indicated generally at 16, may take the form of a spider-like member of cast aluminum or other light metal. A central disc-like portion 17 is received on flange 18 of the sleeve member 14 and is secured to such flange as by cap screws 19. A plurality of depending arms 20 extend from the disc portion of the receiver in radial relation and are formed with concentric steps 21 adapted to receive the beads of tires of different sizes or the rims of wheels of different sizes. A circular ring 22 connects the outer ends of the arms 20 and reinforces the latter against bending and breaking.

On the upper end of the tubular member 6 of the carrier assembly is received the knob 25 which is formed with a knurled external cylindrical surface 26 to serve as a hand grip. The knob has a cylindrical socket which receives a reduced diameter portion on the upper end of the tubular member 6. The knob socket is formed with a counterbore that has internal threads matching the external threads 15 on the upper end of the tubular member 6. The threaded connection between the knob and the tubular member makes it possible to draw the parts snugly together in assembly with the spacing element or tube 10 confined between the fulcrum element 5 and the shoulder 28 at the bottom of the knob socket 29. The spacing element 10 normally projects slightly beyond or out of the upper end of the tubular member 6, there being a slight clearance 30 between the end of the tubular member and the shoulder 28 in the knob socket. The fulcrum element 5 is thus positively clamped and located between the end of the spacer and the shoulder 8 formed in the walls of the tubular member 6. Set screws 32 in threaded bores formed radially in the knob 25 engage the surface of the reduced diameter portion 27 on the upper end of the tubular member 6 to prevent turning of the knob on the latter.

A recess 34 in the top of the knob 25 receives a spirit level assembly for indicating the position of the carrier relative to the horizontal. The spirit level comprises a body of liquid, indicated at 35, enclosed in a casing 36 having a flanged base fastened to the bottom of the recess 34 by screws 37. A transparent glass or closure 38 in the top of the casing 36 permits the operator to observe the "spirit" or bubble 39 in the body of liquid 35. The underside of the sight glass 38 is formed with the usual spherical surface so that the spirit or bubble centers in the sight when the carrier is level or horizontal. The glass may be scored or otherwise marked with concentric circles to indicate the degree of any displacement of the carrier from the center or horizontal position.

Along one side of the tubular member 6 is ground or otherwise formed a flat 40 on which index marks and letters are provided to show the relative position of the sleeve member 14 as the latter is raised or lowered on the tubular member.

When a tire or wheel is placed on the receiver 20 of the carrier assembly the operator readily raises or lowers the carrier to obtain the desired sensitivity in the balance. By grasping the knurled surface of the knob 25 with one hand to prevent rotation of the tubular member 6, the operator then turns or spins the receiver 20 and the sleeve member 14 on the threads 15. This relative turning of the adjustable parts may take place while the tire or wheel remains in position on the receiver 20. The operator can thus raise or lower as a unit the carrier and the wheel or tire supported thereby and can quickly and easily try the balance characteristics and sensitivity at a number of heights. When the relative position of the carrier on the tubular member 6 has been established for any particular size of tire or wheel the operator, by noting the index mark on the flat 40, which lines up with or is adjacent the top of the sleeve 7, can readily reset the parts the next time a tire or wheel of the same type is encountered. Uniform sensitivity for a series of tests is thus obtained.

A wheel or tire is sometimes encountered which is so out of balance that a relatively insensitive balance can be used to advantage in the preliminary stages of determining the amount and placement of such mass or masses as are to be added to give equilibrium. As the balancing proceeds, however, and as the tire or wheel acquires weight distribution which results in substantial equilibrium, the sensitivity of the balancing device must be increased. The device of the present invention is well suited to repeated adjustments of the height relationship of the carrier components and the sensitivity for the reason that the operator need not remove the wheel or tire when shifting the relative positions of the parts. Furthermore, by holding the knob 25 so that the index marks on the flat 40 can be observed during the raising or lowering of the carrier, the operator can determine visually the amount or degree of adjustment and set the adjustment at the relationship of parts which he knows from experience will give the approximate sensitivity for the particular type or model of tire or wheel being balanced.

In accordance with the patent statutes the principles of the present invention may be utilized in various ways, numerous modifications and alterations being contemplated, substitution of parts and changes in construction being resorted to as desired, it being understood that the apparatus shown in the drawings and described above is given merely for purposes of explanation and illustration without intending to limit the scope of the claims to the specific details disclosed.

What I claim and desire to secure by Letters Patent of the United States is:

1. In combination in a balance, a spindle and a support on the spindle, said support comprising a tubular member, a bearing element within the tubular member for engaging the top of the spindle in the provision of a universal pivoting connection when the spindle is received within the tubular member, a spacing element within the tubular member between the bearing element and the upper end of the tubular member to locate the bearing element in predetermined position axially of the tubular member, a sleeve member embracing the tubular member, a carrier on the sleeve member and adapted to receive an article to be balanced to support such article for tilting movements about said pivoting connection, a knob removeably affixed to the upper end of the tubular member and engaging the spacing element to locate and retain the latter in predetermined position, and the members having interfitting threads providing relative vertical adjustment of the sleeve member on the tubular member for raising and lowering the gravity center of a supported article, the knob serving as a handle by means of which the tubular member is restrained against rotation while the sleeve member, carrier and supported article are rotated as a unit in raising and lowering the unit on the spindle by the adjustment threads and while the unit continues to be supported by and on the spindle.

2. In combination in a balance, a spindle and a support on the spindle, said support comprising a tubular member, a bearing element within the tubular member for engaging the top of the spindle in the provision of a universal pivoting connection when the spindle is received within the tubular member, a spacing element within the tubular member between the bearing element and the upper end of the tubular member to locate the bearing element in predetermined position axially of the tubular member, said tubular member having horizontally aligned shoulder means providing support for said bearing element and said bearing element being clamped between said shoulder means and said spacing element, a sleeve member embracing the tubular member, a carrier on the sleeve member and adapted to receive an article to be balanced to support such article for tilting movements about said pivoting connection, a knob removeably attached to the upper end of the tubular member and engaging the spacing element to locate and retain the latter in predetermined position, and the members having interfitting threads providing relative vertical adjustment of the sleeve member on the tubular member for raising and lowering the gravity center of a supported article, the knob serving as a handle by means of which the tubular member is restrained against rotation while the sleeve member, carrier and supported article are rotated as a unit in raising and lowering the unit on the spindle by the adjustment threads and while the unit continues to be supported by and on the spindle.

3. A balance according to claim 2 in which the tubular member is provided with a longitudinal flat portion upon which index marks are imposed so as to register with the top portion of the sleeve member and provide an accurate indication of the relative position of the carrier on the tubular member.

References Cited in the file of this patent

UNITED STATES PATENTS

| Number | Name | Date |
|---|---|---|
| 2,080,939 | Taylor | May 18, 1937 |
| 2,110,343 | Taylor | Mar. 8, 1938 |
| 2,192,363 | Moos | Mar. 5, 1940 |
| 2,270,657 | Kraft | Jan. 20, 1942 |
| 2,316,524 | Martin | Apr. 13, 1943 |
| 2,461,591 | Currier | Feb. 15, 1949 |
| 2,592,804 | Holl | Apr. 15, 1952 |